(12) United States Patent
Cress et al.

(10) Patent No.: US 9,969,107 B2
(45) Date of Patent: May 15, 2018

(54) TREAD BAND DEMOLDING TOOL

(75) Inventors: Ronald Cress, Simpsonville, SC (US); Nathan J. Panning, Simpsonville, SC (US)

(73) Assignee: Compagnie Générale des établissements Michelin, Clermont-Ferrand (FR)

( * ) Notice: Subject to any disclaimer, the term of this patent is extended or adjusted under 35 U.S.C. 154(b) by 542 days.

(21) Appl. No.: 13/002,232

(22) PCT Filed: Jun. 30, 2008

(86) PCT No.: PCT/US2008/068793
§ 371 (c)(1),
(2), (4) Date: Dec. 30, 2010

(87) PCT Pub. No.: WO2010/002390
PCT Pub. Date: Jan. 7, 2010

(65) Prior Publication Data
US 2011/0148001 A1    Jun. 23, 2011

(51) Int. Cl.
*B29C 37/00*  (2006.01)
*B29C 33/44*  (2006.01)
(Continued)

(52) U.S. Cl.
CPC .......... *B29C 33/44* (2013.01); *B29C 33/0055* (2013.01); *B29C 33/442* (2013.01);
(Continued)

(58) Field of Classification Search
CPC ................................................. B29C 33/442
(Continued)

(56) References Cited

U.S. PATENT DOCUMENTS 1,389,221 A * 8/1921 Roussey ................ B29D 30/52
                                                      156/129
1,482,325 A * 1/1924 Shively ........................ 264/326
(Continued)

FOREIGN PATENT DOCUMENTS

DE          286541 A5     1/1991
EP          0583600 A1    2/1994
(Continued)

OTHER PUBLICATIONS

JPO, JPO machine translation of claims, detailed description, and description of drawings of JPS60-89313A, dated Aug. 8, 2016, Claims p. 1, Detailed Description pp. 1-4, and Description of Drawings, p. 1.*

(Continued)

*Primary Examiner* — Matthew Daniels
*Assistant Examiner* — Patrick Butler
(74) *Attorney, Agent, or Firm* — Hahn Loeser & Parks LLP; Bret A. Hrivnak

(57) ABSTRACT

Methods and apparatus for demolding a polymeric material from a mold are disclosed, the methods comprising the steps of placing a material within a mold, closing the mold, molding the material located within the mold, and opening the mold. The mold includes a demolding tool having a material-engaging portion that is in fluid communication with the mold portion, the demolding tool being reversibly disengagable from the first mold member. The demolding tool is disengagable from a resting position within the first mold member to translate from the first mold member the molded polymeric material associated with the material-engaging portion, thereby separating a portion of the molded polymeric material from the mold cavity. In particular embodiments, the material-engaging portion is a cavity. In other embodiments, the material-engaging portion is asso- (Continued)

ciated with one or more longitudinal members extending across a portion of the first mold member.

20 Claims, 8 Drawing Sheets

(51) Int. Cl.
*B29C 33/00* (2006.01)
*B29D 30/06* (2006.01)
*B29L 30/00* (2006.01)

(52) U.S. Cl.
CPC ..... *B29D 30/0606* (2013.01); *B29D 30/0662* (2013.01); *B29L 2030/002* (2013.01)

(58) Field of Classification Search
USPC .................................................. 264/326, 334
See application file for complete search history.

(56) References Cited

U.S. PATENT DOCUMENTS

| | | | |
|---|---|---|---|
| 1,784,780 A | | 12/1930 | Bronson |
| 2,843,896 A | | 7/1958 | Rinella |
| 2,963,743 A | * | 12/1960 | Kraft ............................ 425/193 |
| 3,259,682 A | * | 7/1966 | Neville ......................... 264/312 |
| 3,829,271 A | | 8/1974 | Taylor |
| 3,972,978 A | * | 8/1976 | Caretta ......................... 264/334 |
| 4,076,483 A | | 2/1978 | Smirne |
| 4,247,093 A | | 1/1981 | Kistner et al. |
| 4,371,476 A | | 2/1983 | Newkirk et al. |
| 4,818,203 A | | 4/1989 | Majerus et al. |
| 5,066,448 A | | 11/1991 | Chlebina et al. |
| 5,346,387 A | | 9/1994 | Muller |
| 5,895,621 A | | 4/1999 | Tajiri |
| 6,638,049 B1 | * | 10/2003 | Moss et al. ................... 425/145 |
| 6,685,867 B2 | | 2/2004 | Wellman et al. |
| 6,991,208 B1 | | 1/2006 | Herman |
| 7,153,458 B2 | | 12/2006 | Ide et al. |
| 7,186,103 B2 | | 3/2007 | Menard |
| 7,234,927 B2 | * | 6/2007 | Ebiko et al. ................... 425/46 |
| 2004/0197432 A1 | * | 10/2004 | Menard ........................ 425/28.1 |
| 2007/0092594 A1 | | 4/2007 | Ho et al. |
| 2011/0101568 A1 | | 5/2011 | Gallego et al. |
| 2011/0148001 A1 | | 6/2011 | Cress et al. |
| 2012/0146262 A1 | | 6/2012 | Adams et al. |

FOREIGN PATENT DOCUMENTS

| | | | |
|---|---|---|---|
| EP | 1306182 A2 | | 5/2003 |
| JP | S60-89313 A | * | 5/1985 |
| JP | S6089313 A | | 5/1985 |
| JP | 03-116907 U1 | | 12/1991 |
| JP | H05104534 A | | 4/1993 |
| JP | 2002-120301 A | | 4/2002 |
| JP | 2004-537439 A | | 12/2004 |
| JP | 2005-7713 A | | 1/2005 |
| JP | 2007-81048 A | | 3/2007 |
| WO | 03/013819 A1 | | 2/2003 |
| WO | 2008057077 A1 | | 5/2008 |
| WO | 2013136313 A1 | | 9/2013 |

OTHER PUBLICATIONS

JPO, JPO machine translation of claims, detailed description, and description of drawings of JPH5-111921A, dated Aug. 8, 2016, pp. 1-9.*
JP03-116907 English abstract, 1 page.
JP2002-120301A English abstract with Computer Machine Translation, 6 pages.
JP2004-537439A English abstract with Computer Machine Translation obtained from http://worldwide.espacenet.com on Nov. 23, 2011, 4 pages.
PCT/US2008/068793 International Search Report dated Sep. 29, 2008.
PCT/US2008/068793 Written Opinion dated Sep. 29, 2008.
JP 2005-7713A—English abstract obtained from Espacenet (http://worldwide.espacenet.com) on Jul. 24, 2012, 2 pages.
JP 2007-81048A—English abstract obtained from Espacenet (http://worldwide.espacenet.com) on Jul. 24, 2012, 1 page.

* cited by examiner

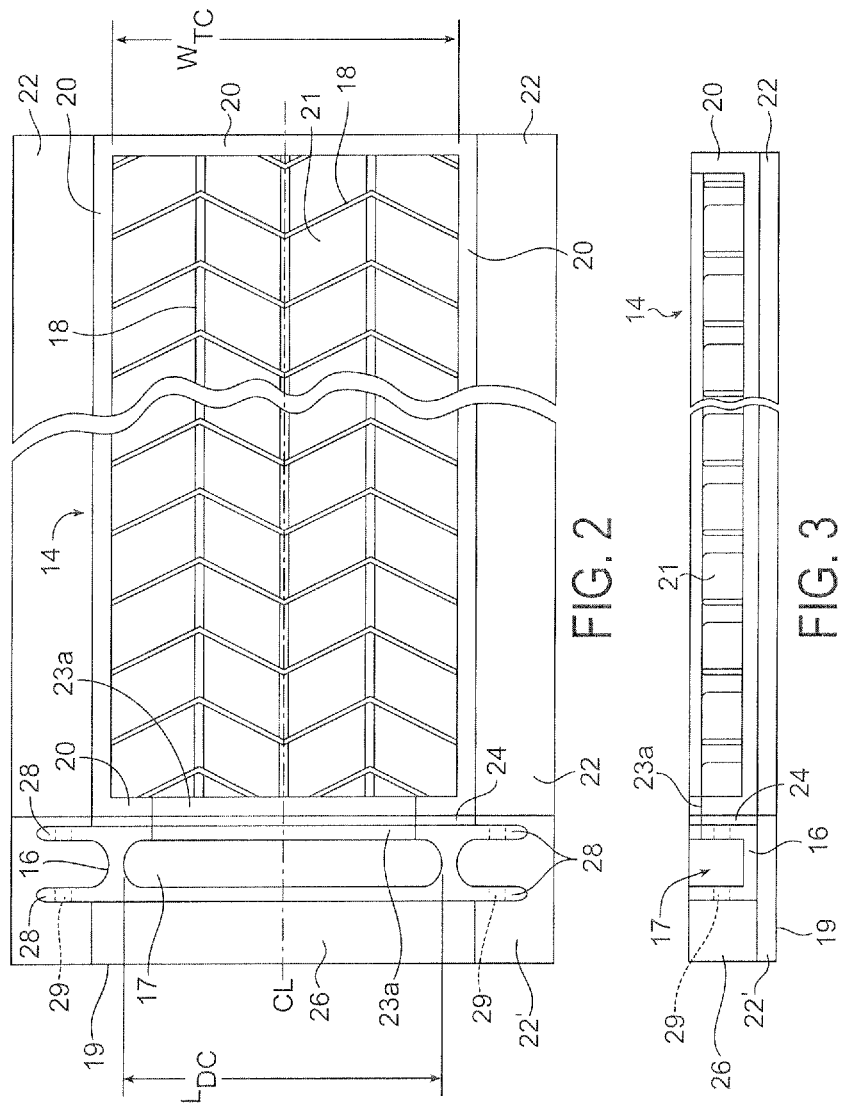

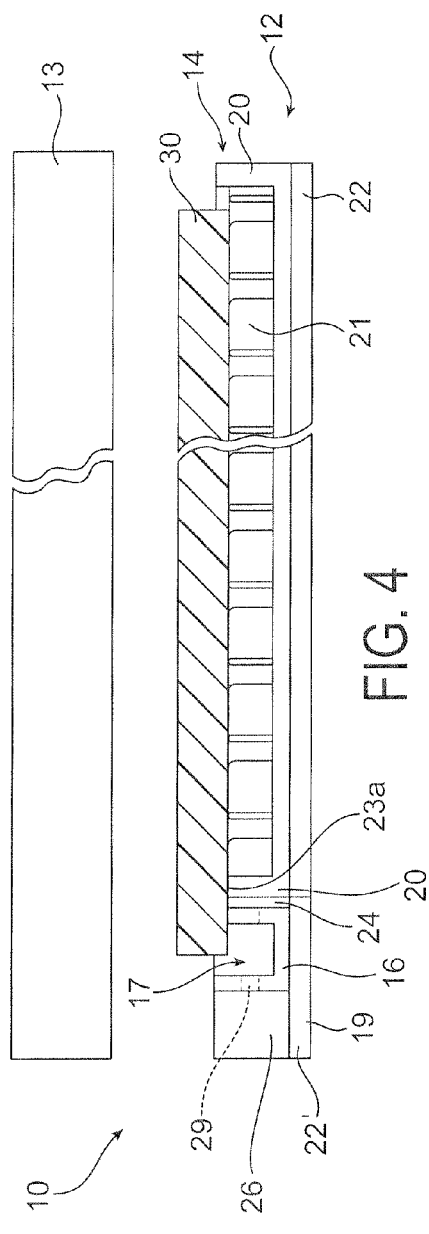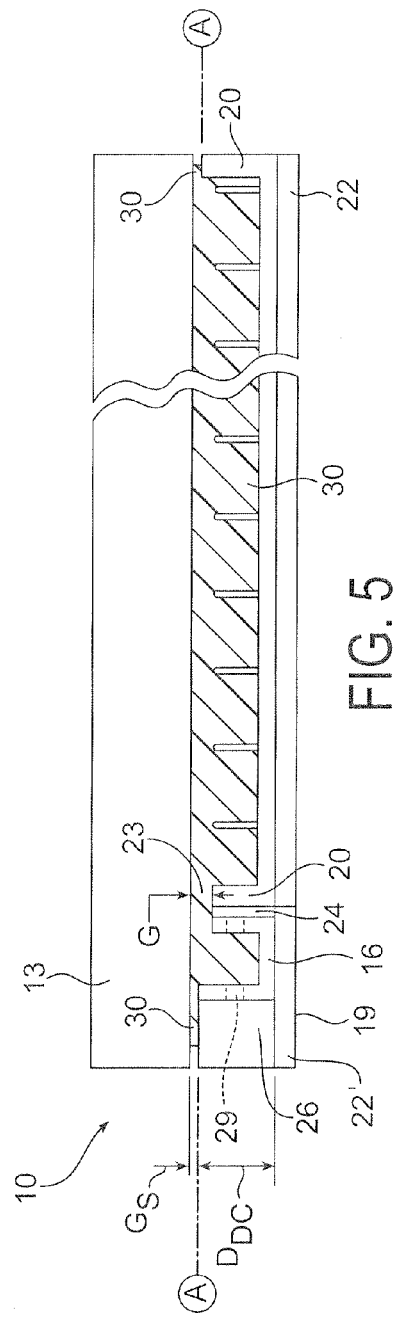

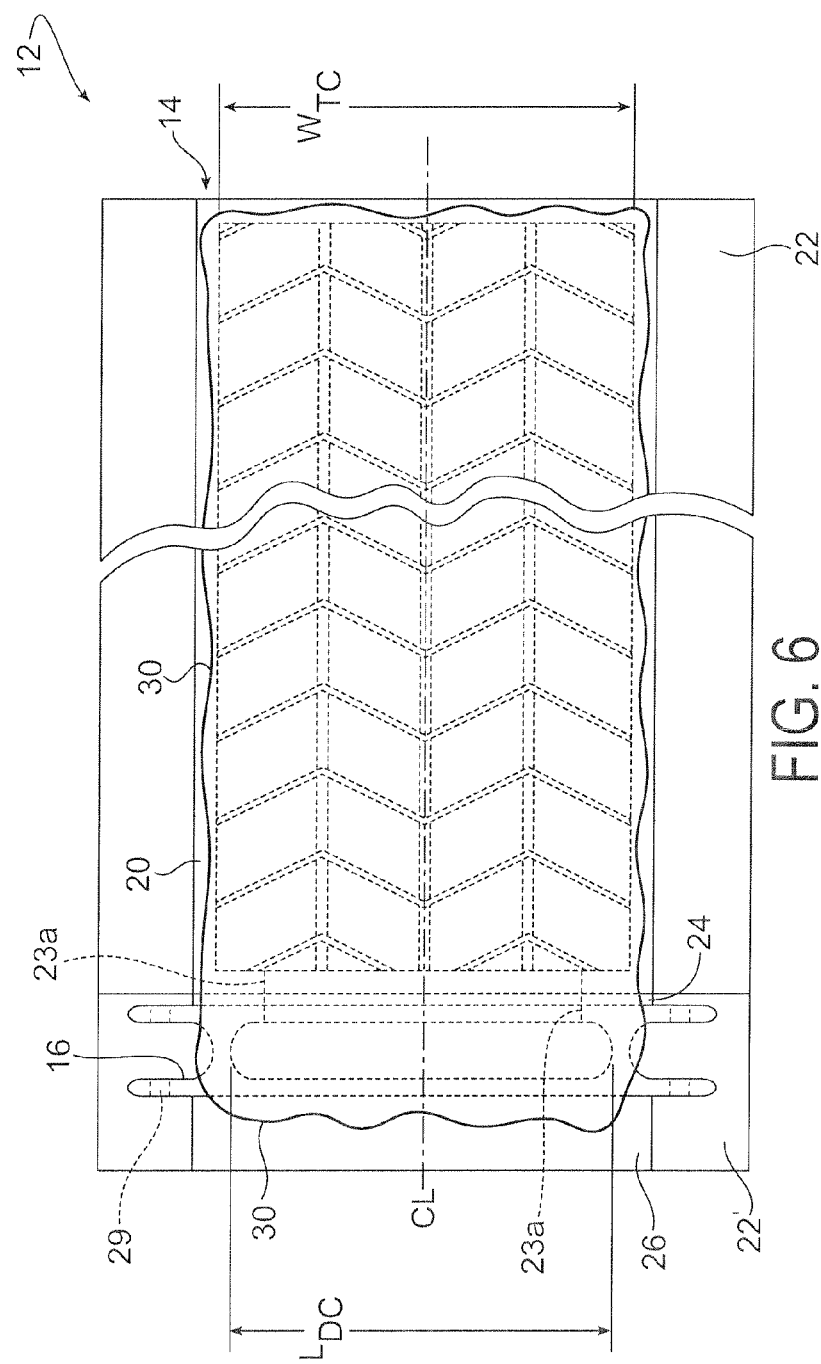

TREAD BAND DEMOLDING TOOL

This application is a National Stage application of International Application No. PCT/US2008/068793, filed Jun. 30, 2008, to which this application claims priority and the benefit of, the disclosure of which is also hereby incorporated by reference.

BACKGROUND OF THE INVENTION

Field of the Invention

This invention relates generally to demolding tools, particularly demolding tools for thermoset or thermoplastic materials. In particular embodiments, the present invention relates to tread band demolding tools.

Description of the Related Art

The curing of thermoset materials such as rubber (both natural and synthetic) in molds to make elastomeric products such as tires and tire components is well known. Typically, a material to be cured is placed in a mold and subjected to heat and pressure until a predetermined amount of crosslinking between molecules has been achieved. The cured article is then removed from the mold and subjected to further manipulation, such as trimming of flash from the edges of the article.

For purposes of process efficiency, it is advantageous to remove molded articles from a mold as quickly as possible without damaging the article, such as by tearing. Removing an article from a mold without damaging the article is particularly important and difficult in the area of tire tread molding. This task is made more difficult because of the intricacies of modern tread patterns. There is a continuing need for tools and methods of removing a molded article from a mold quickly and without damage to the article.

SUMMARY OF THE INVENTION

Particular embodiments of the present invention include methods of demolding a polymeric material from a mold, a demolding tool, and a tire mold including the demolding tool. Particular embodiments of such methods include the steps of placing a polymeric material within a mold, the mold comprising a first mold member and a second mold member, the first and second mold members being reversibly displaceable from each other from a first, closed position in which the first and second members substantially enclose a mold cavity, to a second, open position in which the first and second mold members are displaced from each other, wherein the first mold member contains a mold portion and a demolding tool, the demolding tool including a material-engaging portion that is in fluid communication with the mold portion, the demolding tool being reversibly disengagable from the first mold member. Other steps of such method includes closing the mold by placing the first and second members in the closed position, whereby the polymeric material is distributed at least partially within the mold cavity and in association with the material-engaging portion of the demolding tool to provide a molded polymeric material. Further steps of such method include opening the mold by placing the first and second members in the open position, the first mold member containing molded polymeric material, and disengaging the demolding tool from a resting position within first mold member to translate from the first mold member the molded polymeric material associated with the material-engaging portion, thereby separating a portion of the molded polymeric material from the mold cavity.

A demolding tool for use with a mold for polymeric material is also provided. Particular embodiments of such demolding tool include a material-engaging portion positioned along the tool for association with a portion of the molded polymeric material contained with the mold, the demolding tool being adapted to be placed in fluid communication with a mold cavity of the first mold member, and to reversibly engage a first mold member of the mold, whereby the portion of molded polymeric material is translated from the first mold member to facilitate the separation of at least a remaining portion of the molded polymeric material from the mold cavity.

A tire mold having a demolding tool comprises a first mold member and a second mold member, the first and second mold members being reversibly displaceable from each other from a first, closed position in which the first and second members substantially enclose a mold cavity, to a second, open position in which the first and second members are displaced from each other. Further, the first mold member of the tire mold contains a mold portion and a demolding tool, where the demolding tool includes a material-engaging portion that is in fluid communication with the mold portion such that when the mold is filled with a polymeric material and closed, the polymeric material at least partially fills the mold cavity and engages a material-engaging portion of the demolding tool. In particular embodiments, the demolding tool is reversibly disengagable from the first mold member.

The foregoing and other objects, features and advantages of the invention will be apparent from the following more detailed descriptions of particular embodiments of the invention, as illustrated in the accompanying drawing wherein like reference numbers represent like parts of the invention.

BRIEF DESCRIPTION OF THE DRAWINGS

FIG. 2 is a top view of the first mold member shown in FIG. 1.

FIG. 3 is a cross-sectional view of the first mold member shown in FIG. 2.

FIG. 4 is a cross-sectional view of a mold in an open configuration of the mold, the mold including the first mold member of FIG. 2.

FIG. 5 is a cross-sectional view of the mold of FIG. 4 in a closed configuration.

FIG. 6 is a cross-sectional view of the mold shown in FIG. 5 along orientation line A-A, showing the cured material form in relation to the mold.

DETAILED DESCRIPTION OF PARTICULAR EMBODIMENTS

Figure 1:
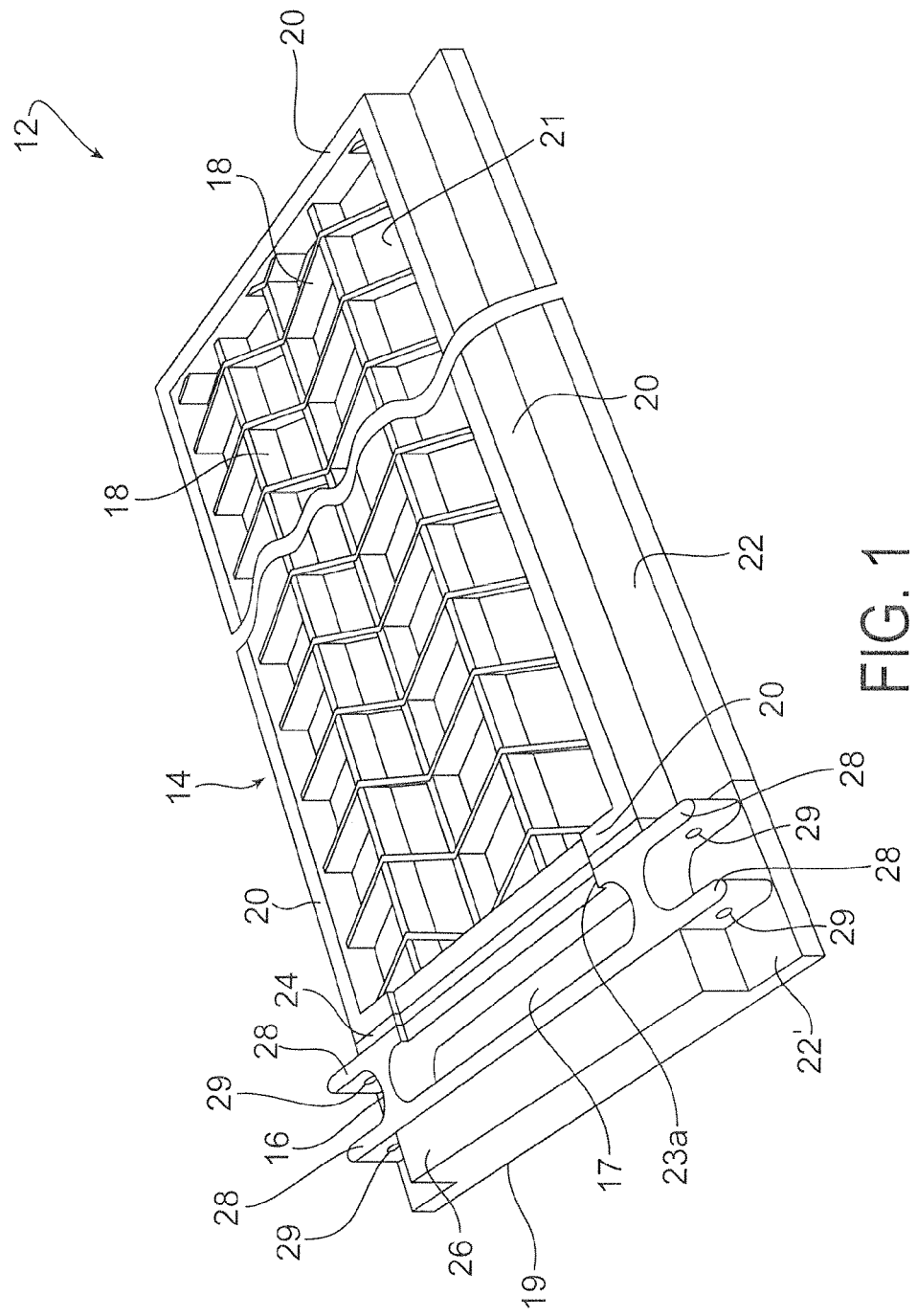
FIG. 1 is an isometric view of a first mold member according to an embodiment of the invention.

Particular embodiments of the present invention provide methods of demolding polymeric material, such as a thermoset or thermoplastic material, from a mold, a demolding tool for use with a polymeric material mold, and a tire mold having a demolding tool.

During the molding of rubber parts such as tire treads, a polymerizable composition is typically placed in a mold, molded, cured and then removed from the mold. Because of the intricacy of modern tire tread design, the step of removing a cured tire tread from a mold without damage to the tread can be difficult. It is also an advantage to the overall molding process, if the step of demolding minimizes the formation of scrap material.

With these considerations in mind, a method of demolding a polymeric material from a mold includes the steps of placing a polymeric material within a mold, closing the mold, opening the mold and disengaging a demolding tool from a molding portion of a mold. The mold may be made of any of a variety of materials, such as aluminum, steel, alloys thereof, ceramic or even plastic, depending on the material being molded and/or cured. The mold comprises a first mold member and a second mold member, which are reversibly displaceable from each other. The first and second mold members may comprise a platen or other supporting member or structure (collectively referred to herein as "platen") associated with a press (in which the mold is positioned), and/or one or more mold members or mold portions placed on a platen for the application of heat and/or pressure to mold the polymeric material and in the case of thermoset polymers, to create crosslinks in the polymeric material to provide an at least partially cured material. In a first, closed position, the first and second members cooperate to close the mold and substantially enclose a mold cavity and in a second, open position, the first and second members are displaced from each other and the mold is in an open configuration.

The first mold member contains a mold portion and a demolding tool. In particular embodiments, the demolding tool has a length extending relative to one or more sides of the demolding cavity, which includes extending parallel or biased to any such sides. It is contemplated that the length of the demolding tool may be equal to a width of the demolding tool. In particular embodiments the demolding tool is a bar. Further, demolding tool may extend in a generally planar fashion, or may extend in a non-linear or curvilinear manner. The demolding tool includes a material-engaging portion that is in fluid communication with the mold portion. The material-engaging portion engages a portion of the molded polymeric material during translation of demolding tool from the first mold member, for the purpose of separating at least a portion of the remaining molded material from the mold cavity (i.e., demolding the molded material from the mold cavity). In particular embodiments, material-engaging portion includes a demolding cavity, which may be formed within the demolding tool or in association with other components, such as when the cavity is otherwise open along one or more sides. In such embodiments, other component may comprise other components of the mold, such as, for example, the mold portion or one or more portions of a channel in which tool rests. In other embodiments, material-engaging portion of the demolding tool is defined by one or more longitudinally-extending members. The longitudinally-extending members include one or more surfaces along which molded material engages during translation thereof from the first mold member. In further embodiments, the material-engaging portion of the demolding tool is further defined by a pair of spaced-apart end members positioned along the one or more longitudinally-extending members. End members generally assist in constraining polymeric material within the demolding tool; however, it is contemplated that such constraints may not be needed, such as when, in certain embodiments, the material-engaging portion is located within the mold cavity and certain portions of the mold cavity (or mold portion) act to constrain the polymeric material. Accordingly, the material-receiving portion may simply consist of a member for lifting or otherwise engagingly translating a portion of the molded material.

In particular embodiments, a connection portion may extend between the mold portion/mold cavity and the demolding tool, and more specifically, the material-engaging portion of the demolding tool. The connection portion provides a gap that may be formed by maintaining a spacing between first and second mold members, and/or by forming a recess or trough along the demolding tool, the mold portion, and/or along any components located there between. When the mold is filled with a material to be molded and is then closed, the polymeric material is distributed at least partially within (or at least partially fills) the mold portion and/or mold cavity and a demolding cavity in the demolding tool. In other embodiments, the material substantially fills the demolding cavity. In particular embodiments, the material at least partially flows from the mold portion to the demolding cavity through the gap. In other embodiments, the material may overflow the walls of the mold cavity and demolding tool to form "flash" which seals for the material in the mold cavity. The connection portion may be sized in relation to the properties of the material being molded, to provide adequate material for accomplishing the demolding of the material as described herein.

The demolding tool is reversibly disengagable from the mold portion. The method further includes separating or disengaging (i.e., translating) the demolding tool containing molded polymeric material from a resting position within first mold member to translate from the first mold member the molded polymeric material associated with the material-engaging portion, thereby separating the polymeric material contained within molding cavity. By translating the material associated with the demolding tool from the first member, demolding forces are imparted upon the material remaining within the mold portion or the mold cavity of the first mold member. Accordingly, the material is at least partially separated from the mold portion or mold cavity. Optionally, the step of opening the mold may include the step of separating the demolding tool of the first mold member from the first mold member. For example, the demolding tool can be attached to the second mold member. In that example, when the mold is opened and the second mold member is separated from the first mold member, the demolding tool is also displaced from the mold portion of the first mold member. When the polymeric material has been at least partially removed from the mold cavity, the demolding tool can then be removed from the remainder of the material. The polymeric material can then be trimmed and subjected to further processing as needed. For example, when the mold is of a tire tread, the cured material is trimmed and further processed to be incorporated into a tire.

In one particular embodiment, the demolding tool of the first mold member is located at a longitudinal end of the first mold member. In another embodiment, one or more demolding tools are located at a position internal to or within a mold cavity. Stated differently, one or more demolding tools may be located within a mold portion or cavity (which may be between two or more mold portions or cavities), wherein the demolding cavity may be used to form a usable portion of the cured material form. Accordingly, when mold forms a tire tread, demolding cavity may form a portion of the tire tread, and, in particular embodiments, may comprise one or more of the pitches forming a tire tread. In another embodiment, the demolding tool extends laterally in relation to the mold. In other words, the demolding tool extends across a width of the first mold portion. In other embodiments, the demolding tool extends beyond a width or length of the mold portion. The tool may extend beyond a portion of the mold portion, which may facilitate removal or disengagement of the demolding tool from the first mold member (i.e., the mold portion and/or the mold cavity). In particular embodiments, demolding tool may include protrusions and/or tool connection apertures or cavities to facilitate removal or disengagement of the demolding tool. The tool connection apertures or cavities may be used to affix or attach securing devices such as fasteners, pins, clips, or other securing mechanisms for attaching and connection any linkage, cable, wire, or the like (discussed further below) to demolding tool. The protrusions and tool connection apertures or cavities may be positioned along any portion of demolding tool, which includes any side, which includes any end, of the tool.

The methods can be utilized where the polymeric material is a curable material and the method additionally includes at least partially curing the polymeric material. The methods are suitable for use for thermoset materials such as butadiene or isoprene, for thermoplastic materials, or for mixtures or copolymers of those materials. In one particular embodiment, the mold is a tire tread mold and the polymeric material is a tire tread rubber.

The method may include an automated step of disengaging the demolding tool from the mold portion. Alternatively, that step may be performed manually. The method also permits additional components to be made part of, or to be attached to, the demolding tool. For example, demolding tool may include one or more demolding protrusions to facilitate separation of the demolding tool and the polymeric material from the mold cavity. In particular embodiments, the one or more demolding protrusions may be located along one or more sides of the demolding tool. In specific embodiments, the one or more protrusions extend from opposing end sides of the demolding tool.

A demolding tool for use with a polymeric material mold is also provided. The demolding tool is adapted to be positioned relative to at least a first portion of a mold and contains a material-engaging portion adapted to be placed in fluid communication with a molding cavity of the mold. The demolding tool is further adapted to reversibly engage the first portion of the mold. The demolding tool may be positioned within a channel or base located within the first mold member. The demolding tool and the first portion of the mold may be adapted to engage a platen.

The demolding tool is adapted to be separated from the first portion of the mold by a manual or automated process. In particular embodiments, the demolding tool may be adapted so that the process of demolding a polymeric material is automated. In one embodiment, the demolding tool can be adapted to engage a second portion of the mold, where the second portion of the mold is adapted to cooperate with the first portion of the mold to substantially enclose the molding cavity and demolding cavity for molding of a polymeric material. In such an example, the demolding tool is separated from the first portion of the mold when the mold is opened by the second portion of the mold after molding of the polymeric material. In other embodiments, the second portion of the mold is a top platen of a press. Embodiments of separating demolding tool from the first portion of the mold include mechanically separating demolding tool by way of a tool or other mechanical apparatus.

In the embodiments mentioned above, the demolding tool may be adapted for use with a mold for a thermoset material. In particular, the mold may be a tire tread mold.

A tire mold having a demolding tool comprises first and second mold members which are reversibly displaceable from each other. In a first, closed position the first and second members cooperate to substantially enclose a mold cavity. In a second open position, the first and second members are displaced from each other. The first mold member contains a mold portion in fluid communication with a demolding tool, the demolding tool including a material-engaging portion that is in fluid communication with the mold portion. When the mold is filled with a polymeric material and closed, the polymeric material at least partially fills the mold cavity and engages a material-engaging portion of the demolding tool. In particular embodiments, a connection portion fluidly connects the demolding tool and the mold portion and cavity, which is adapted to become at least partially filled when the mold is filled with polymeric matieral. The polymeric material may be a thermoset material such as compositions containing butadiene, isoprene or the like, or the polymeric material may be a thermoplastic material such as a polyester or polycarbonate. The demolding tool of the first mold member is reversibly disengagable from the mold portion. In particular embodiments, the dimensions of the demolding cavity and the connection cavity are selected such that upon detaching of the demolding tool from the mold portion, at least a portion of the polymeric material is lifted from the mold cavity with the material contained within the demolding cavity.

In some examples, the demolding tool is adapted to engage the second mold member, such that the demolding member is separated from the mold portion when the second mold member is separated from the first mold member after at least partial curing of a tire tread. In particular embodiments, the demolding tool contains one or more protrusions extending from one or more sides of the demolding tool. In specific embodiments, the one or more protrusions extend from opposing end sides of the demolding tool. These protrusions may contain tool connection apertures or cavities by which the second mold member engages the demolding tool. In one particular embodiment, the demolding tool has a pair of protrusions on each side, each protrusion having an aperture. A securing means or device, such as a pin, clip, fastener, hook, eye, or any other known or useful securing device is inserted into or through the apertures or cavities, and a connection means, such as a cable, wire, bar, bracket, linkage, or any other known or useful connection device or structure is attached to the securing device on one end and to the second mold member on the other, thereby attaching the demolding tool to the second mold member.

In certain embodiments, the demolding tool is located at a longitudinal end of the first mold member. In some embodiments, the demolding tool extends laterally in relation to the mold. In addition or in the alternative, the demolding tool is positioned within a channel or base located within the first mold member. In particular embodiments, the demolding tool channel or base is located on a longitudinal end side surface of the first mold member.

The methods and apparatuses described herein may be described in exemplary embodiments which are discussed in further detail below. In these exemplary embodiments, a first mold member is shown as being a lower horizontal member of a multi-member mold while a second mold member is shown as a top or upper horizontal member or platen. However, it should also be understood that the present invention is not so limited and the positions of the first and second mold members may also be altered or even reversed such that first mold member is the top or uppermost member of such a multi-member mold while the second mold member is the bottom or lowermost member. In some embodiments, both the first and second mold members include a mold cavity. Accordingly, it is contemplated that demolding tool may be used in the first and/or second mold member or mold portion, that is, in the any top or bottom mold member or mold portion.

Figure 8:
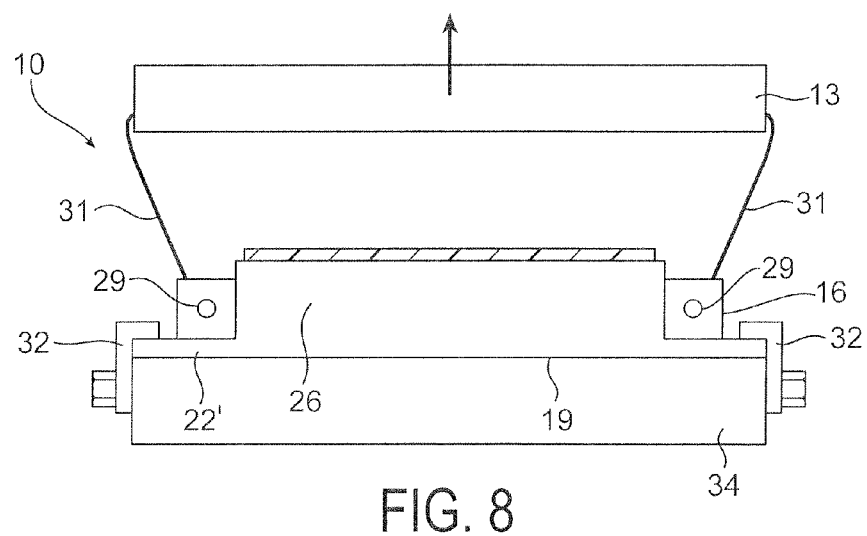
FIG. 8 is an end view of an embodiment of a mold wherein the demolding tool of FIG. 1 is connected to the second mold member.

FIGS. 1-3 provide a first mold member 12 of mold 10, the first mold member 12 comprising a mold portion 14 and a demolding tool 16. In particular embodiments, mold portion 14 and demolding tool 16 may include tabs 22 and 22', which provide a surface for securing mold portion 14 and demolding tool 16, respectively, to a press or platen (i.e., which includes any supporting member or structure), through which heat may be applied to the material being molded (and in some embodiments, cured), such as a thermoset or thermoplastic material. Tabs 22 and 22' may be separate pieces for mold portion 14 and demolding tool 16, respectively, or may be a single member. In an exemplary embodiment, FIG. 8 shows mold portion 14 and demolding tool 16 secured to a bottom platen 34.

In particular embodiments, mold portion 14 is bounded by a plurality of walls 20 enclosing a mold cavity 21 having a width $W_{TC}$. In particular embodiments, mold cavity 21 is a tread cavity. Mold portion 14 also contains a plurality of feature members 18 within mold cavity 21, which together form a negative relief, such as, in particular embodiments, of a tire tread pattern.

Demolding tool 16 is not limited to any particular shape or size. In a particular embodiment, the demolding tool 16 is a bar or other member that contains a demolding cavity 17 having a length $L_{DC}$. Demolding cavity 17 generally forms a material-engaging portion of the demolding tool 16. A material-engaging portion, with regard to any embodiment of tool 16, at least partially receives and forms a portion of molded polymeric material 30 in association with tool 16, which it then engages when translating with demolding tool 16 during disengagement from first mold member 12. In other embodiments, demolding tool 16 may comprise any structure, other than a bar, containing a demolding cavity 17. With general reference to the FIGURES, a single demolding cavity 17 is shown. However, it is contemplated, in other embodiments, that demolding cavity 17 may be divided into a plurality of cavities 17, or demolding tool 16 may otherwise include a plurality of demolding cavities 17. In the embodiment shown, demolding cavity 17 is generally U-shaped in cross section at the centerline CL. However, demolding cavity 17 may comprise any size and shape, and the capacity of demolding cavity 17 may be adjusted as desired for the particular application and the material being molded, among other factors. In particular embodiments, demolding cavity 17 may be sized to minimize scrap. In one example, $L_{DC} < W_{TC}$. In other examples, $L_{DC}$ is less than 90, 80, 70, 60 or even 50 percent of $W_{TC}$. In particular embodiments, of a tire tread mold, the width of the tread cavity $W_{TC}$ and length of demolding cavity $L_{DC}$ are similar, each of which may be between about 4 inches (10.2 cm) and about 16 inches (40.6 cm). In various embodiments, the depth $D_{DC}$ of demolding cavity 17 is between 0.25 inches (0.6 cm) and 4 inches (10.2 cm). In particular embodiments, the depth of demolding cavity 17 is approximately the average molded depth of mold portion 14 or tread cavity 21; however, any other depth may be used as desired for any particular application.

In the embodiment shown, demolding tool 16 rests between a first stop 24 and a second stop 26. In particular embodiments, first stop 24 and second stop 26 may be joined or formed as a unitary whole to provide a base 19, which forms a channel 25 (or, "cradle") within which demolding tool 16 rests as shown in the FIGURES. Base 19 and/or channel 25 may continuously extend along a length or width of the tool 16 (as exemplified in the FIGURES), or may extend intermittently, such as when base 19 or channel 25 comprises two or more portions that are arranged longitudinally in a spaced apart manner to form a intermittently extending base 19 or channel 25 for demolding tool 16 to rest. Base 19 may include tabs 22', which may be used to secure or constrain base 19 to a platen 34 (i.e., a supporting structure), as shown by example in FIG. 8. In other embodiments, channel 25 may be formed by placing demolding tool 16 immediately adjacent mold portion 14 or a side wall 20 thereof, thereby eliminating the need for first stop 24. Accordingly, it is contemplated that base 19 may not include first stop 24, or second stop 26. Channel 25 may also be formed by placing demolding tool 16 between first and second stops 24, 26 and atop platen 34 or other surface. The dimensions of demolding tool 16, first stop 24, second stop 26 and channel 25 may be chosen keeping in mind the size and expansion of certain materials, such as metals, when heated, and the internal pressures achieved within mold 10 during curing operations. First stop 24 and second stop 26 may be any size and shape. In one embodiment, first stop 24 has a width approximately equal to or less than any wall 20. In another embodiment, the width of first stop 24 is less than the width of second stop 26.

In particular embodiments, second stop 26 is sized to withstand the internal pressures of the mold 10. In various embodiments, demolding tool 16 may have one or more protrusions 28 for engaging a demolding tool removal means. Protrusions 28 may be located at any location along demolding tool 16, which includes any side thereof. In the embodiment shown, demolding tool 16 has one or more protrusions 28 extending from each side end, which, in particular embodiments, extend laterally relative the mold portion, or longitudinally relative the demolding tool. Protrusions 28 may extend beyond first stop 24 and second stop 26, as well as tab 22'. Each protrusion 28 may contain one or more tool connection apertures or cavities 29, which may be utilized to engage the second mold member 13, as described more fully below. Apertures or cavities 29 may be located in any protrusion 28, and/or may be located along any other portion of demolding tool 16, which includes any sides thereof. Although apertures are shown in the FIGURES, aperture 29 represents a cavity as well for inserting any securing devices, such as a fastener or the like. Therefore, the use of aperture herein also refers to cavities.

Figure 9:
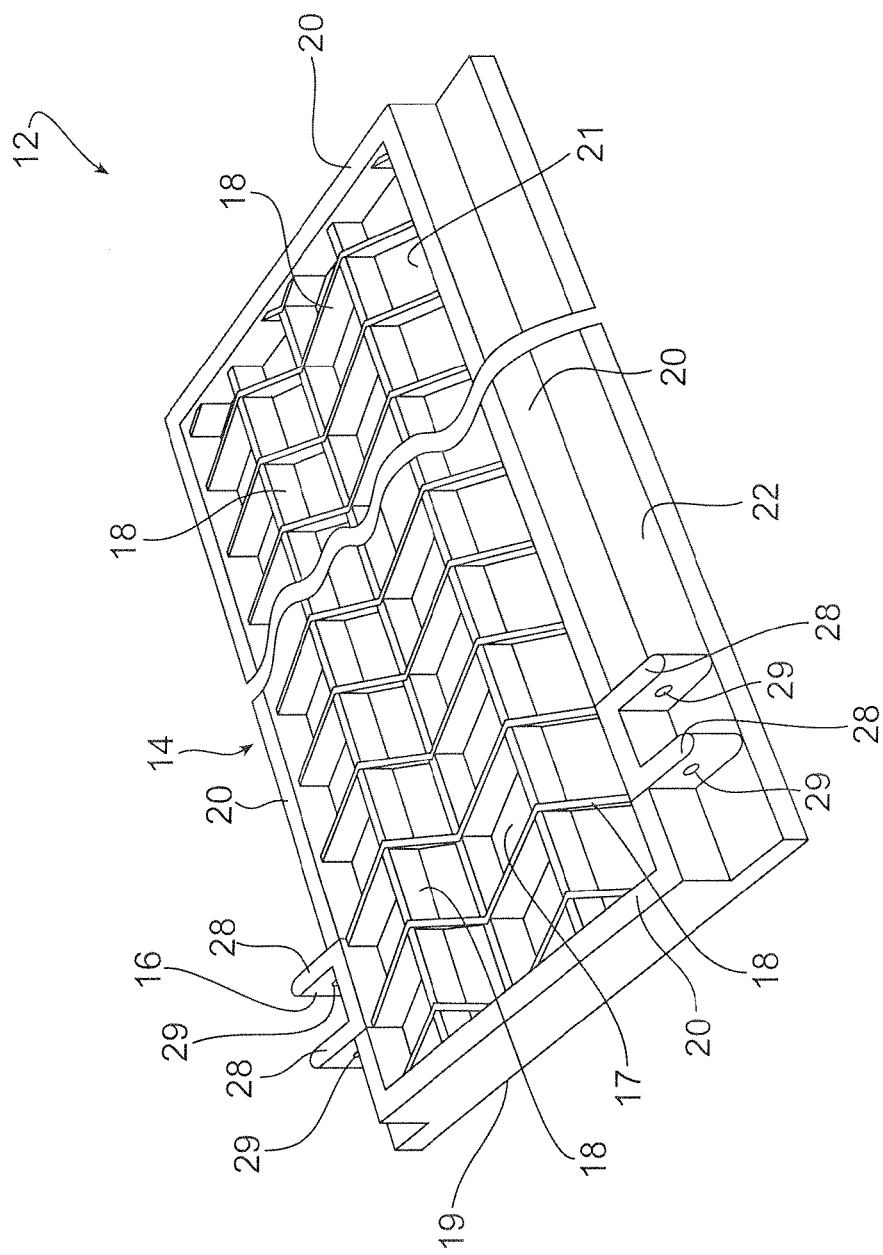
FIG. 9 is an isometric view of a first mold member according to another embodiment of the invention, wherein the demolding tool is located within the molding portion and forms a portion of the molding cavity.

Demolding tool 16 may be located at any location relative to mold portion 14. In the embodiments shown, demolding tool 16 is located along a longitudinal end of mold portion 14. Demolding tool 16 may extend laterally or longitudinally relative to mold portion 14, which may also be a continuous or intermittent extension. In particular embodiments, demolding tool has a length and extends relative to one or more sides of mold portion 14, which includes extending parallel or biased relative to any such side. Further, demolding tool 14 may extend linearly, curvilinearly, or non-linearly in any direction, including lengthwise. In other embodiments, such as shown in FIG. 9 in an exemplary embodiment, demolding tool 16 may be located within mold portion 14, where demolding cavity 17 forms a useful portion of the molded material of mold 10. In such embodiments, at least portions of demolding tool 16 and/or cavity 17 may include or form one or more mold features 18 of mold cavity 21 and/or walls 20 of mold portion 14. In more specific embodiments, demolding cavity 17 may form a portion of a tire tread, which, in particular embodiments, may form a pitch of the tread design. Similarly, it is also contemplated that demolding tool 16 may be located between two or more mold portions 14. In particular embodiments, two or more demolding tools 16 may be used independently or cooperatively within a single mold 10 to facilitate demolding of molded material.

In particular embodiments, a connection portion 23 extends between mold portion 14/mold cavity 21 and demolding cavity 17, which forms a gap G. Because connection portion 23 may be formed within tool 16, connection portion 23 may form a material-engaging portion of demolding tool 16. Connection portion 23 may be formed by maintaining a spacing between first and second mold members 12, 13, as shown in FIG. 5 and represented by $G_S$. In addition to, or in lieu of spacing $G_S$, connection portion 23 may comprise a trough or recess 23a extending between demolding cavity 17 and mold portion 14/mold cavity 21 and formed along intervening mold components, which may include in various embodiments, a side wall of demolding cavity 17, first stop 24, and a wall 20 of mold portion 14. Connection portion 23 facilitates fluid communication of material 30 between mold portion 14/mold cavity 21, and demolding cavity 17, which may assist in achieving a desired distribution of material 30 within mold 10. Connection portion 23 also provides an extension of material 30 having a thickness associated with gap G, which extends between material 30 associated with demolding cavity 17 and mold portion 14/mold cavity 21. This thickened extension of material 30 facilitates demolding of a cured form from mold 10 by transferring demolding forces and displacements associated with the removal of demolding tool 16 from its resting position (i.e., a curing position) in mold 10. Accordingly, the depth of connection portion 23 may be any size, and in particular embodiments, sized according to the properties of material 30 to maintain the material integrity of the associated cured form during demolding operations. In the FIGURES, the width of trough 23a extends substantially the length $L_{DC}$ of demolding cavity 17. However, trough 23a may comprise any other width, and in particular embodiments, the width of trough 23a may extend the full width (i.e., lateral extension) of first stop 24, demolding tool 16, mold portion 14, and/or mold cavity 21. In the embodiment shown in the FIGURES, connection portion extends the entire width of mold portion 14, since the first and second mold members 12, 13 are spaced apart by $G_S$. In the embodiment where demolding tool 16 is positioned within mold portion 14 or mold cavity 21, and between mold portions 14 or tread cavities 21, connection portion 23 is the material 30 located adjacent demolding cavity 17 that attaches demolding cavity 17 to the adjacent portion of the cured form, wherein the connection portion 23 forms a portion of the useable form, such as, for example, a portion of tire tread.

A method of demolding a polymeric material from a mold as provided by the invention may be described with reference to FIGS. 4-8. The polymeric material may be a thermoset or thermoplastic material. Thermoset materials include natural and synthetic rubber, such as polymers and co-polymers of butadiene and/or isoprene. Thermoplastic materials include polymers such polyesters, polycarbonates and the like. FIG. 4 shows a side view of a mold 10 including first mold member 12 and second mold member 13 in an open configuration of the mold, that is, with first mold member 12 and second mold member 13 displaced from each other. Second mold member 13 may be flat, textured, and/or include forms for creating cured features in material 30, and accordingly, may form a portion of a platen of a press (as shown in the FIGURES) or may comprise one or more mold portions exemplified by mold portion 14. Although not shown in the FIGURES, a demolding tool 16 may be used or adapted for use in a clam-shell type mold or press, or any other type of mold or press that may be known or used in the art. A polymeric material 30 to be molded is placed within mold 10 in an amount sufficient that when first and second mold members 12, 13 are moved to a closed position as shown in FIG. 5, material 30 occupies a predetermined portion of mold cavity 21 and demolding cavity 17. In operation, material 30 extends, and may flows, through a connection portion 23 associated with gap G, which extends between mold cavity 21 and demolding cavity 17. Connection portion 23 generally forms a space between the second mold member (or platen) 13 on one side, and first mold member 12 on the other. Connection portion 23 may be formed by providing a trough 23a formed along the components positioned between mold portion 14/mold cavity 21 and demolding cavity 17, and/or by generally maintaining a desired spacing $G_S$ between the first and second mold members 12, 13 during curing operations (which is generally shown as the spacing between side walls 20 of mold portion 14 and second mold member 13 in FIG. 5). The molding material 30 is portioned such that it also occupies a predetermined amount of demolding cavity 17. In embodiments where a spacing is provided between first and second mold members 12, 13 during curing operations, an amount of excess material 30 escapes from mold cavity 21 and demolding cavity 17 and forms a seal between first mold member 12 and second mold member 13 along the perimeter of demolding tool 16 and mold portion 14 as illustrated in FIG. 6. This portion of material 30 is referred to as "flash." The flash may also extend between protrusions 28, providing an additional portion of material secured to demolding tool 16.

Figure 7:
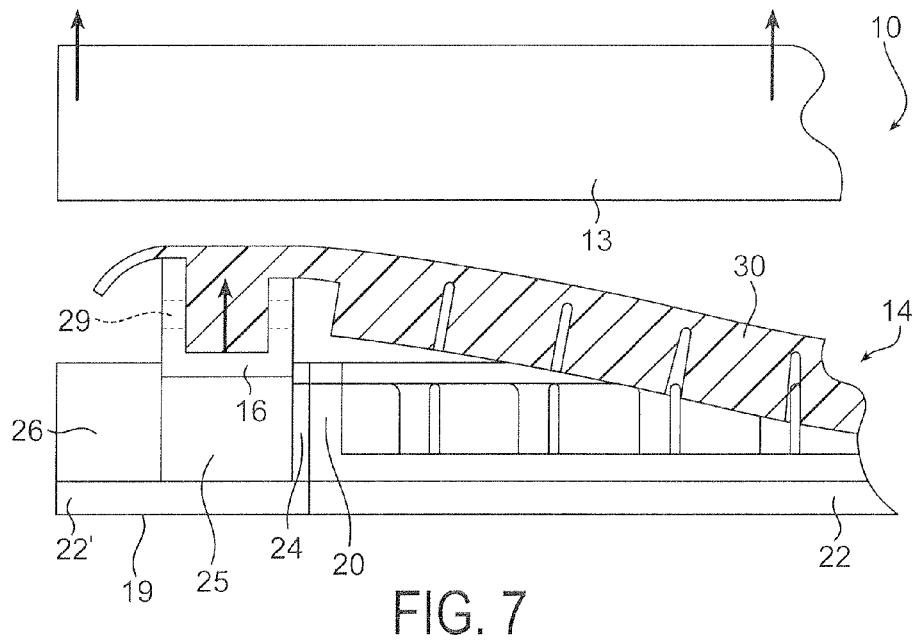
FIG. 7 is a cross-sectional view of the mold shown in FIG. 6, following at least partial cure of a polymeric material within the mold, wherein a demolding tool of the mold is being separated from the first mold member.

After material 30 has been molded and/or cured a predetermined amount and it is desired to remove the molded and/or at least partially cured material 30 from mold 10, first mold member 12 and second mold member 13 are separated and returned to an open configuration, thereby opening mold 10, as shown in FIGS. 7 and 8. In the embodiments shown, second mold member 13 is shown moving away from first mold member 12. However, it is sufficient for first and second mold members 12, 13 to separate without regard to the movement of either or both members 12, 13. During or shortly after the opening of mold 10, demolding tool 16 is removed from its resting position, which may be within a channel 25 formed by first stop 24 (or wall 20 when first stop 24 is absent) and second stop 26. As demolding tool 16 is lifted with material 30 in demolding cavity 17, material 30 is also lifted from mold portion 14 or mold cavity 21.

As shown in FIG. 8, second mold member 13 may engage demolding tool 16 by one or more connection means 31, which may comprise a wire, cable, bar, bracket, linkage, hook, eye, or any other known or useful connection device or structure, which can be attached to demolding tool 16, for example through apertures 29. In particular embodiments, securing means, such as pins, clips, fasteners, or any other known or useful securing device (not shown) are inserted into apertures 29 to secure or attach connection means 31 to demolding tool 16. One end of each connection means 31 is attached to the pins, while the opposite end is attached to second mold member 13, which may be, for example, a platen, an associated mold portion 14, or any other component of such second mold member 13. In such an embodiment, as second mold member 13 is separated from first mold member 12, demolding tool 16 is automatically lifted form its resting position within first mold member 12 when the limit of connection means 31 is reached and second mold member 13 continues to separate from first mold member 12. Such an automatic separation of demolding tool 16 from the mold portion 14 of first mold member 12 is not required. Demolding tool 16 may be removed from mold portion 14 manually, mechanically, or any other non-automated manner. Alternatively, demolding tool 16 may only be partially removed from channel 25 automatically with removal of demolding tool 16 being completed manually.

In particular embodiments, as shown in FIG. 8 by example, tab 22' (and also tab 22) may be attached to a bottom platen 34 by one or more brackets secured by additional fasteners, or by any other known means, thereby insuring firm contact between tab 22, 22' and platen 34 and insuring that a molded form can be easily separated from mold portion 14 of first mold member 12.

Figure 10:
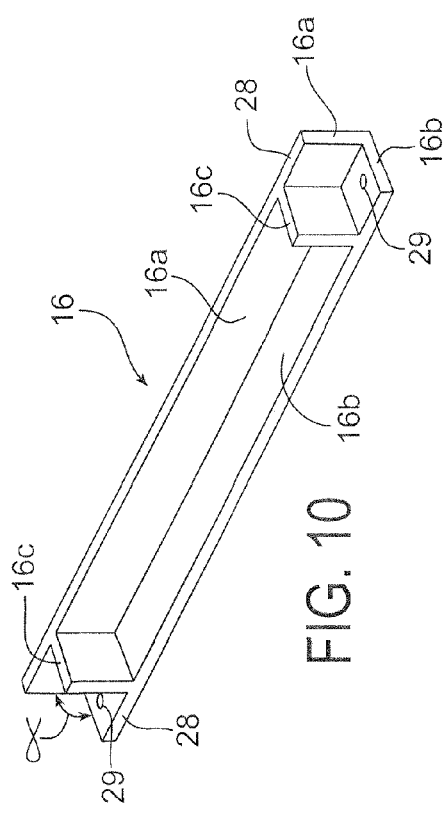
FIG. 10 is an isometric view of the demolding tool, in accordance with another embodiment of the invention
Figure 11:
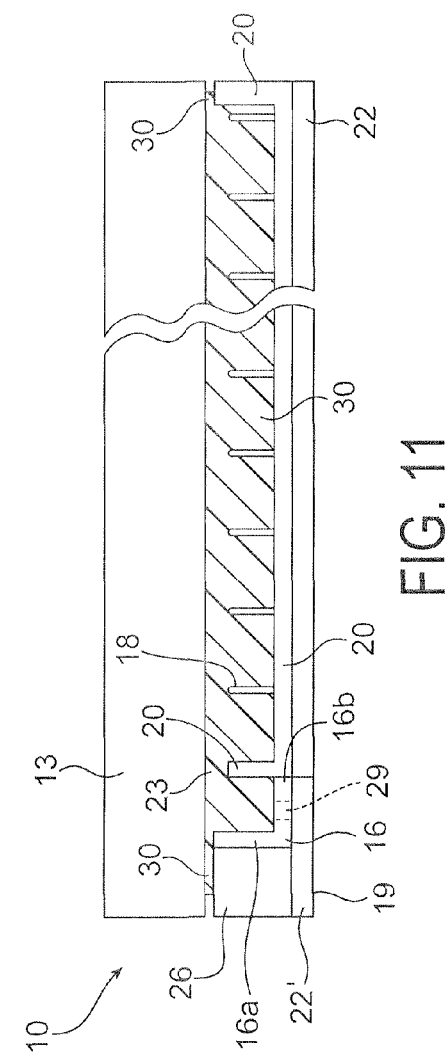
FIG. 11 is a cross-sectional view of the demolding tool of FIG. 10 being used within a mold shown in a closed configuration.

With reference to FIGS. 10-13, alternative embodiments of demolding tool 16 are contemplated. In such embodiments, demolding tool 16 may comprise a bar or any other structural member that does not have a cavity for receiving molding material 30. Accordingly, in particular embodiments, such those shown in FIGS. 10-11, demolding tool 16 comprises a first member 16a and a second member 16b to provide a material-engaging portion, the members 16a, 16b being associated by an angle a, which may be any angle, including 90 degrees. Second member 16b may extend from a terminal location of first member 16a (which is generally shown in FIGS. 10-11 as a bottom end of member 16a), or may extend from a medial or intermediate location along the height of first member 16a, or tool 16. In particular embodiments, end members 16c may be included to assist in constraining polymeric material along demolding tool 16, and to better define the material-engaging portion. When used, end members 16c may be operate as, or function similarly to, mold portion sides 20 or mold cavity features 18, such as when demolding tool 16 forms a portion of mold portion 14 or mold cavity 21, respectively, which is generally shown in FIGS. 10-11. However, it is contemplated that one or both end members 16c may not be used, such as when the length of demolding tool 16 is less the width of mold portion 14 or mold cavity 21, so that end members 16c are not needed or desired. End members 16c may be used in other embodiments of the present invention, which includes the embodiments discussed below, when demolding tool comprises either 16a or 16b. Members 16a, 16b, 16c may each be formed independently and joined by any known means, or may be formed together as a part of a unified whole. Further, in any non-cavity embodiments, one or more of each member 16a, 16b, 16c may be used, each of which may extend continuously or intermittently as desired.

Figure 12:
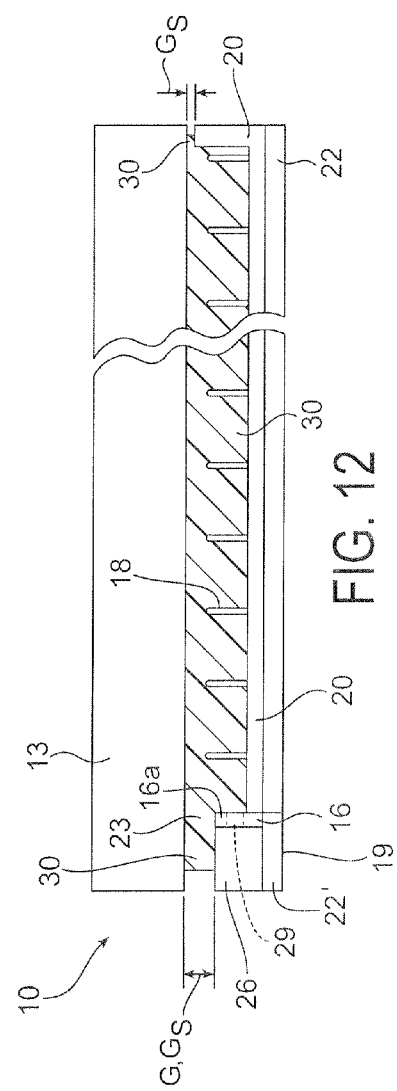
FIG. 12 is a cross-sectional view of an alternative embodiment of the demolding tool shown in FIGS. 10 and 11, the tool being used within a mold shown in a closed configuration.

Similar embodiments provide a demolding tool 16 formed of either first or second member 16a, 16b, respectively. With reference to FIG. 12, demolding tool 16 includes a first member 16a. At least one or more surfaces of the first member 16a are exposed to form material-engaging portions, which in part mold the received material 30 and engage the same during removal thereof during demolding tool 16 removal (disengagement). In such embodiments, the height of tool 16 may be decreased to provide more molded material 30, such as in gap G and/or $G_s$, for example, may provide a more rigid interface between tool 16 and material 30 for lifting (demolding) molded material 30 from mold portion 14. In particular embodiments, the height of tool 16 may be reduced fully or partially across a width of demolding tool 16, and therefore first member 16a may include a connection portion 23, which, in one embodiment, is similar to that which is shown in FIG. 1. Further, at least a portion of the height of second stop 26 may be reduced in addition to tool 16. While demolding tool 16 is shown in FIG. 12 as forming a wall 20 of mold portion 14, tool 16 may be located outside mold portion 14, or may be located within mold portion 14, where tool 16 could form a feature member 18. It is also contemplated that one or more end members 16c may used with these embodiments.

Figure 13:
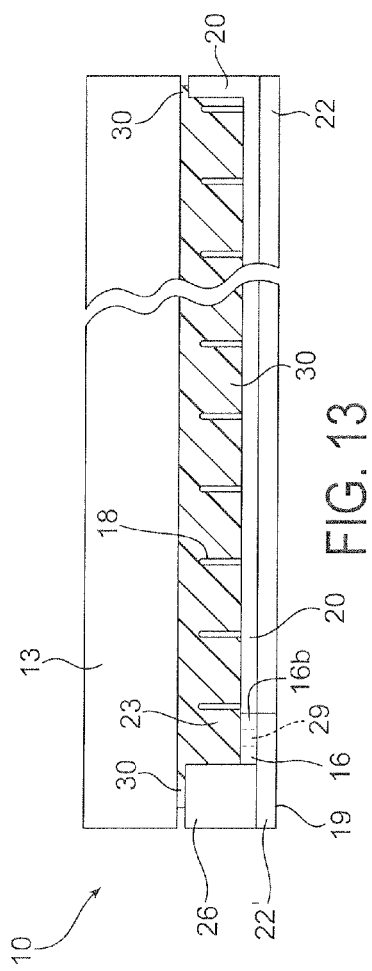
FIG. 13 is a cross-sectional view of an alternative embodiment of the demolding tool shown in FIGS. 10-12, the tool being used within a mold shown in a closed configuration.

Still further, with reference to FIG. 13, other non-cavity demolding tools 16 may include second member 16b without first member 16a. Second member 16b may be orientated to occupy a bottom surface of mold portion 14, or cavity 21, or may extend at any location between first and second mold members 12, 13 to provide a material-engaging portion of demolding tool 16. Second member 16b also may be positioned between mold portions 14 or cavities 21. Further, second member 16b may be positioned adjacent to, or outside mold portion 14, and cavity 21, so to be associated with a non-useable portion of molded material 30. Accordingly, it is contemplated that second member 16b may be positioned at an elevation relative to the bottom of mold portion 14 and/or cavity 21. It is contemplated that one or more end members 16c may used with the embodiments discussed herein.

Further, first member 16a may be oriented in any relation to material 30 and mold 10, which includes being arranged biased (inclined) relative to the thickness of material 30. This biased relation may provide more lifting surface area between member 16 and material 30 such as when second member 16b is not present. Similarly, second member 16b may be inclined relative to the thickness of material 30 when placed within mold 10. It is contemplated that any embodiment of tool 16 discussed herein may be tilted or biased relative to the material 30 or to any component of mold 10.

As discussed previously, tool 16 may extend at least the cavity width $W_{TC}$, or any other greater or lesser distance as desired. Accordingly, tool 16, or any portion thereof, such as first and second members 16a, 16b or cavity 17, generally extend across any width of a mold portion 14 and/or a mold cavity 21, and may do so at in a continuous or intermittent manner. In any embodiment, first member 16a and/or second member 16b may comprise any cross-sectional shape, which may be constant or variable along a length of tool 16.

The embodiments of demolding tool 16 exemplified by FIGS. 10-12 are generally operated and used as discussed above with reference to other embodiments, including those shown in FIGS. 1-9. Accordingly, each embodiment shown in FIGS. 10-12, as well as any other embodiment of demolding tool 16, may include an aperture 29 for inserting any lifting or separating tool, mechanism, or fastener for securing a tool or attachment means, such as, for example, a cable, chain, wire, linkage, hook, eye, or the like to facilitate removal of tool 16 from first mold member 12 or second mold member 13. Aperture 29 may be formed along any portion of demolding tool 16, including first member 16a and second member 16b. Other means of facilitating the removal of demolding tool 16 from first mold member 12, or from second mold member 13, may be facilitated by any other means, which may include providing any other connection or attachment means, such as, for example, a bracket or the like.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A method of demolding polymeric material from a tire tread band mold, the method comprising the steps of:
   placing a polymeric material within a tire tread band mold configured to form a tire tread having a thickness arranged between a first side of the tire tread and a second side of the tire tread, the first side having a tread pattern;
   the polymeric material being a tire tread band material, the tire tread band mold comprising a first mold member and a second mold member, the first and second mold members being reversibly displaceable from each other from a first, closed position in which the first and second members substantially enclose a mold cavity, to a second, open position in which the first and second mold members are displaced from each other, wherein the first mold member contains a mold portion and a demolding tool, the demolding tool being adjacent to and detachable from the mold portion, the demolding tool further including a demolding cavity at least partially defined by the demolding tool, the demolding cavity forming a material-engaging portion, wherein the demolding cavity is in fluid communication with the mold cavity, where the first mold member is configured to form the first side of the tire tread with the tread pattern;
   closing the tire tread band mold by placing the first and second members in the closed position, whereby the polymeric material is distributed at least partially within the mold cavity and in association with the material-engaging portion of the demolding tool to provide a molded polymeric material comprising a tire tread;
   opening the tire tread band mold by placing the first and second members in the open position, the first mold member containing the molded polymeric material; and,
   disengaging the demolding tool from a resting position within the first mold member, wherein the demolding tool imparts demolding forces upon the molded polymeric material, the demolding forces causing at least a portion of the molded polymeric material to separate from the first mold member.

2. The method of claim 1, wherein the demolding tool has a length extending relative to one or more sides of the demolding cavity, and the material-engaging portion of the demolding tool being defined by one or more members extending along at least a portion of the length.

3. The method of claim 2, wherein the material-engaging portion of the demolding tool is further defined by a pair of spaced-apart end members positioned along the one or more longitudinally-extending members.

4. The method of claim 1, wherein the step of opening the tire tread band mold includes the step of disengaging the demolding tool from a resting position within the first mold member.

5. The method of claim 1, wherein the demolding tool is manually disengaged in the step of disengaging.

6. The method of claim 1, wherein one or more protrusions extend from a side surface of the demolding tool to facilitate disengagement of the demolding tool from the first mold member.

7. The method of claim 1, wherein the demolding cavity is at least partially separated from the mold cavity by a wall of the tire tread band mold.

8. The method of claim 1, wherein the demolding tool is disengaged from a resting position within the first mold member such that the demolding forces cause at least a portion of the molded polymeric material to separate from the mold cavity in a direction perpendicular to the surface of the first mold member that contacts the second mold member in the closed position and towards the second mold member.

9. The method of claim 1, wherein the resting position within the first mold member is defined at least in part by a first stop adjacent to the mold portion and a second stop, wherein each of the first stop and the second stop is parallel to a length of the demolding tool.

10. The method of claim 1, wherein the demolding tool is arranged within the first mold member to form a portion of the mold cavity formed between the first and second mold members such that at least a portion of the demolding tool arranged along the first mold member is configured to be arranged along an external side of the molded polymeric material within the mold cavity.

11. The method of claim 10, wherein said at least a portion of the demolding tool configured to be arranged along an external side of the molded polymeric material lifts adjacent molded polymeric material outwardly from the mold cavity.

12. The method of claim 1, wherein the demolding tool remains in the resting position when opening the tire tread band mold.

13. The method of claim 1, wherein both the mold cavity and the demolding tool include one or more mold features, wherein the one or more mold features form a negative relief in the molded polymeric material, wherein the molded polymeric material is present within both the mold cavity and the demolding tool.

14. The method of claim 13, wherein at least a portion of the demolding tool forms a portion of the mold cavity.

15. The method of claim 1, further comprising detaching the demolding tool from the mold portion, wherein the demolding tool is fully detached from both the first mold member and the second mold member.

16. The method of claim 15, where the demolding tool remains attached to the second mold member by one or more connection means.

17. A method of demolding polymeric material from a tire tread band mold, the method comprising the steps of:
   placing a polymeric material within a tire tread band mold configured to form a tire tread having a thickness arranged between a first side of the tire tread and a second side of the tire tread, the first side having a tread pattern;

the polymeric material being a tire tread band material, the tire tread band mold comprising a first mold member and a second mold member, the first and second mold members being reversibly displaceable from each other from a first, closed position in which the first and second members substantially enclose a mold cavity, to a second, open position in which the first and second mold members are displaced from each other, wherein the first mold member contains a mold portion and a demolding tool, the demolding tool being adjacent to and detachable from the mold portion, the demolding tool further including a demolding cavity at least partially defined by the demolding tool, the demolding cavity forming a material-engaging portion, wherein the demolding cavity is in fluid communication with the mold cavity by way of a connection portion, wherein the connection portion extends between the mold cavity and the demolding cavity such that the demolding cavity is spaced apart from the molding cavity, further wherein at least a portion of the connection portion is separate from both the mold cavity and the demolding cavity, where the first mold member is configured to form the first side of the tire tread with the tread pattern;

closing the tire tread band mold by placing the first and second members in the closed position, whereby the polymeric material is distributed at least partially within the mold cavity and at least partially within the connection portion and in association with the material-engaging portion of the demolding tool to provide a molded polymeric material comprising a tire tread;

opening the tire tread band mold by placing the first and second members in the open position, the first mold member containing the molded polymeric material; and, disengaging the demolding tool from a resting position within the first mold member, wherein the demolding tool imparts demolding forces upon the molded polymeric material, the demolding forces causing at least a portion of the molded polymeric material to separate from the first mold member.

18. The method of claim 17, wherein the connection portion is at least partially formed within the demolding tool.

19. The method of claim 17, wherein the demolding tool rests between a first stop and a second stop, the first stop and the second stop being joined to provide a base, which forms a channel within which the demolding tool rests.

20. The method of claim 17, further comprising detaching the demolding tool from the mold portion wherein the demolding tool is fully detached from both the first mold member and the second mold member.

* * * * *